Patented Jan. 9, 1940

2,186,464

UNITED STATES PATENT OFFICE 2,186,464

CONDENSATION PRODUCT AND METHOD OF PREPARING SAME

Ernst Alfred Mauersberger, Maarssen, near Utrecht, Netherlands, assignor to Alframine Corporation, New York, N. Y., a corporation of New York No Drawing. Application October 18, 1939, Serial No. 299,976

6 Claims. (Cl. 260—404)

My invention relates to new condensation products which result from the reaction of chemical compounds having the general formula $$R.CO.(NH.C_xH_{2x})_n.NH.C_yH_{2y}.OH$$

in which R represents any aliphatic chain having at least 7 carbon atoms and containing saturated, unsaturated or hydroxylic groups, $x$ and $y$ each represent a number from 2-5 and $n$ a number from 0-3, with aliphatic aldehydes containing 1-5 carbon atoms in the molecule. The subject matter of this case consists of disclosure part of which is found in my copending application Serial No. 259,113, and the remainder is found in my copending application Serial No. 259,112.

The starting materials for the preparation of the products of the present invention are fatty acid alkylolamide bodies having the general formula given above and may be prepared by effecting a reaction between fatty acids or their esters and monoalkylolamines having the general formula:

$$NH_2.(C_xH_{2x}.NH)_n.C_yH_{2y}.OH$$

in which $x$ and $y$ each represent a number from 2-5 and $n$ a number from 0-3.

Other reactions than that just described may be used in preparing the desired starting materials; for example, the fatty acids or their esters may first be converted by means of ammonia into the corresponding fatty acid amides and the latter then treated with alkylene oxides, chlorhydrines, etc. and possibly also with ammonia and polyethylenepolyamines. The method by which these starting materials are prepared is not germane to my invention and it is merely essential that the aliphatic chain R contain at least 7 carbon atoms. The chain may be saturated or unsaturated and may also contain a hydroxyl group, which would be the case if, for example, castor oil or its fatty acids were used.

Among the fats, oils and fatty acids which I may use are cocoanut oil, sperm oil, palm seed oil, cod liver oil, hardened cod liver oil, olive oil, castor oil, tea seed oil, etc. and their fatty acids.

The selected substance according to the first formula is then caused to react with an aliphatic aldehyde containing 1-5 carbon atoms in the molecule.

I may use the aldehydes in concentrated form but inasmuch as by doing so a relatively strong heat of reaction is developed, it is generally preferable to use the aldehydes in aqueous solution. The reaction temperature fluctuates in accordance with the concentration of the aldehyde solution, the length of the chain and the number of NH groups in the molecule, and generally varies between room temperature and 150° C., and in the latter case it is desirable to carry out the reaction in an autoclave.

The aldehyde is preferably used in excess, which may be distilled off and recovered upon completion of the reaction. Should the starting material contain a number of NH groups, the reaction may be performed so that only one single NH group of each molecule enters into reaction. In the latter case the reaction mostly occurs directly at relatively low temperature, while in the case of a plurality of NH groups higher temperatures are required.

Upon completion of the reaction, which is usually within about two hours, the reaction product is heated to about 140° C., to distill off the added water, the water of reaction and the excess aldehyde, and this temperature is maintained until nothing more distills over. I may, if desired, use vacuum at this temperature to drive off the last dissolved residues of aldehyde, although this is not essential.

The following equation illustrates the course of the reaction when acetaldehyde is used in a case where $y=x$:

$$2R.CO.(NH.C_xH_{2x})_n.OH + nCH_3.COH = \begin{matrix} R.CO.(N.C_xH_{2x})_n.OH \\ | \\ C_2H_4 \\ | \\ R.CO.(N.C_xH_{2x})_n.OH \end{matrix} + nH_2O$$

I may use a variety of aldehydes, among them being formaldehyde, acetaldehyde, propylaldehyde, butylaldehyde, crotonaldehyde, etc. containing up to 5 carbon atoms in the molecule.

The condensation products, freed of water, are distinguished by a very low melting point in comparison with that of the starting material, and an emulsifiability for water and oils.

If starting materials are used with the general formula $$R.CO.(NH.C_xH_{2x})_n.NH.C_yH_{2y}.OH$$

in which $n$ represents a number from 1-3, and $x$ and $y$ each represent a number from 2-5, the obtained condensation products are soluble in all kinds of aqueous acid solutions.

The following examples will serve to illustrate, without limiting, my invention:

Example 1

500 gr. of a condensation product having a melting point of 46° C., and an acetyl number of 239, and which was produced by heating 100 parts of castor oil and 20 parts of monoethanolamine for two hours up to 230° C., are placed with 170 ccm. of a 30% formaldehyde solution into an autoclave where they are heated for one hour up to 130° C., and stirred throughout the heating time. The solution is then cooled, whereby the excess of formaldehyde solution which did not enter into reaction separates and may be used in the succeeding reaction. The reaction mixture is then heated to 140° C., with constant stirring, thus distilling over any formaldehyde still in solution, together with some water, the formaldehyde being recoverable. The contents of the autoclave are again cooled producing a soft mass having a melting point of about 22° C., and an acetyl number of 291. This mass, after standing for a considerable time takes on the consistency of butter, is pure white in color and odorless.

Example 2

500 gr. of a condensation product, which was produced by heating 100 parts of cocoanut oil and 27 parts of monoethanolamine to 200° C., are introduced into a closed boiler together with 150 ccm. of a 35% formaldehyde solution, the mixture stirred and slowly heated to 90° C., maintained at this temperature for about two hours, whereupon water and excess formaldehyde are distilled off. The resulting reaction product is a soft, wax-like mass, having a melting point of 38° C., and the formula of which is:

$$R.CO.N.C_2H_4.OH$$
$$H-C-H$$
$$R.CO.N.C_2H_4.OH$$

in which R represents the aliphatic chain of the cocoanut fatty acid.

Example 3

500 parts by weight of the starting material of Example 1 and 50 parts by weight of an 80% acetaldehyde are slowly heated to 70° C., in an agitating boiler and held at this temperature for about one hour. The whole is then rapidly heated to 140° C., to distill off the excess aldehyde with the water. The resulting reaction product is light red in color, has a melting point of 31° C., is emulsifiable with water, and the formula thereof is:

$$R.CO.N.C_2H_4.OH$$
$$H-C-H$$
$$H-C-H$$
$$R.CO.N.C_2H_4.OH$$

in which R represents the chains of the castor oil fatty acids.

Example 4

500 gr. of a condensation product obtained by heating 300 parts by weight of fatty acids of olive oil and 95 parts by weight of monoisobutanolamine to 200° C., are introduced together with 60 parts by weight of a 33% formaldehyde solution into a pressure boiler, are therein constantly stirred and heated to 120° C., at which the boiler contents are maintained for about two hours. At the end of this period the formaldehyde has completely entered into reaction, the water of reaction is distilled off and there remains a light yellow, readily water emulsifiable oil, which hardens slowly in the cold and the formula of which is:

$$R.CO.N.C_4H_8.OH$$
$$H-C-H$$
$$R.CO.N.C_4H_8.OH$$

Example 5

300 gr. of castor oil fatty acids and 100 gr. of hydroxyethylethylenediamine are heated to 200° C., to effect conversion into the corresponding amide having the following structural formula:

$$R.CO.NH.C_2H_4.NH.C_2H_4.OH$$

The resulting amide has a melting point of about 30° C., only hardens below 20° C., and is white in color. This amide together with 200 ccm. of a 34% formaldehyde solution are heated to 135° C., in an autoclave. After two hours the solution is cooled, an aqueous layer of a dilute formaldehyde solution separates and this is removed. Thereupon the remaining golden yellow oil is heated to 140° C., in order to drive off any dissolved aldehyde contained therein. After cooling, a golden yellow oil remains which stays fluid at even 5° C. The reaction product probably consists of a mixture of the two following bodies:

$$R.CO.N.C_2H_4.NH.C_2H_4.OH$$
$$H-C-H$$
$$R.CO.N.C_2H_4.NH.C_2H_4.OH$$

and $$R.CO.N.C_2H_4.N.C_2H_4.OH$$
$$H-C-H \quad H-C-H$$
$$R.CO.N.C_2H_4.N.C_2H_4.OH$$

a side reaction may also produce another product, the formula of which is:

$$R-CO-N-C_2H_4-N-C_2H_4-OH$$
$$\phantom{R-CO-N}\underline{\phantom{--}CH_2\phantom{--}}$$

Example 6

300 parts by weight of castor oil and 120 parts by weight of hydroxypropylethylenediamine are heated to 200° C. for two hours, to effect conversion into the corresponding amide having the following structural formula:

$$R-CO-NH-C_2H_4-NH-C_3H_6-OH$$

100 parts of this condensation product are heated with 50 parts by weight of a 34% formaldehyde solution up to 80° C., which process is carried out in a closed boiler to obviate losses of aldehydes. During the heating the mass in the boiler is constantly stirred, and as soon as the temperature has reached 80° C., the mass is kept at this temperature for two hours, the stirring being continued. At the expiration of the two hours the product is cooled and the water which has separated out together with the excess formaldehyde is drawn off. The reaction product has the following formula:

$$R-CO-N-C_2H_4-N-C_3H_6-OH$$
$$\phantom{R-CO-N}H-C-H \quad H-C-H$$
$$R-CO-N-C_2H_4-N-C_3H_6-OH$$

A side reaction has also produced another product, the formula of which is:

$$R-CO-N-C_2H_4-N-C_3H_6-OH$$
$$\phantom{R-CO-N}\underline{\phantom{--}CH_2\phantom{--}}$$

I claim:

1. The herein described process of producing chemical compounds, which comprises reacting at elevated temperatures aliphatic aldehydes containing 1 to 5 carbon atoms in the molecule, with compounds having the general formula:

$$R.CO.(NH.C_xH_{2x})_n.NH.C_yH_{2y}.OH$$

in which R represents any alkyl or hydroxy-substituted alkyl chain of a fatty acid, containing at least 7 carbon atoms, $x$ and $y$ each represent a number from 2 to 5 inclusive and $n$ represents a number from 0 to 3 inclusive.

2. The process of claim 1, including the additional step of removing the excess aldehyde and water of reaction from the condensation product.

3. As a new compound, the product of the reaction of an aliphatic aldehyde containing 1 to 5 carbon atoms with a compound having the general formula:

$$R.CO.(NH.C_xH_{2x})_n.NH.C_yH_{2y}.OH$$

in which R represents any alkyl or hydroxy-substituted alkyl chain of a fatty acid containing at least 7 carbon atoms, $x$ and $y$ each represent a number from 2 to 5 inclusive and $n$ represents a number from 0 to 3 inclusive.

4. The new compound according to claim 3 in which R contains unsaturated groups.

5. The new compound according to claim 3 in which R contains one hydroxyl group and one unsaturated group.

6. The new compound according to claim 3, in which $n$ represents a number from 1 to 3 inclusive.

ERNST ALFRED MAUERSBERGER.